United States Patent [19]
Lebsack et al.

[11] Patent Number: 5,813,907
[45] Date of Patent: Sep. 29, 1998

[54] CASING HOPPER FOR MEAT EMULSION MACHINE, AND METHOD OF USE THEREOF

[75] Inventors: Kenneth L. Lebsack; Craig A. Smiens, both of Ankeny; Brent M. Veldkamp, Des Moines, all of Iowa

[73] Assignee: Townsend Engineering Company, Des Moines, Iowa

[21] Appl. No.: 933,906

[22] Filed: Sep. 23, 1997

[51] Int. Cl.⁶ .................................................. A22C 11/00
[52] U.S. Cl. ................................................ 452/32; 452/33
[58] Field of Search ................................ 452/32, 33, 34, 452/36, 30

[56] References Cited

U.S. PATENT DOCUMENTS

| | | |
|---|---|---|
| 3,191,222 | 6/1965 | Townsend . |
| 3,195,176 | 7/1965 | Washburn ................................. 452/33 |
| 3,672,001 | 6/1972 | Greider . |
| 5,092,814 | 3/1992 | Kasai et al. ............................... 452/32 |
| 5,297,983 | 3/1994 | Mueller et al. ............................ 452/33 |

FOREIGN PATENT DOCUMENTS 2077244 12/1981 United Kingdom .

*Primary Examiner*—Willis Little
*Attorney, Agent, or Firm*—Zarley, McKee, Thomte, Voorhees & Sease

[57] ABSTRACT

A sausage encasing machine has a frame, a meat emulsion pump, a hollow meat emulsion stuffing horn with a discharge end and being longitudinally moveable on the frame. A conventional power means is provided to longitudinally move the stuffing horn. A conventional meat emulsion pump, a rotatably mounted chuck, and a lengthening device are mounted in alignment on the frame. A casing hopper is pivotally mounted on the frame between the pump and the chuck and is adapted to hold a plurality of shirred hollow elongated casings. A cradle mechanism is movably mounted in the hopper and has opposite spaced moveable finger assemblies therein for guiding an elongated shirred hollow elongated casing in the hopper to a position of longitudinal alignment with the stuffing horn. A method for positioning an elongated hollow shirred casing in position on a sausage making machine for penetration by an elongated stuffing horn involves the steps of placing a plurality of the casings in a hopper in parallel stacked relation to each other. A moveable cradle is provided in the hopper to hold an elongated hollow shirred casing from among the plurality of casings in the hopper. The cradle is moved to locate the elongated hollow shirred casing in an operating position to be filled with meat emulsion. The stuffing horn is moved longitudinally into and through the casing into the operating position. That casing is released by the cradle, and the casing in the operating position is filled with meat emulsion.

12 Claims, 8 Drawing Sheets

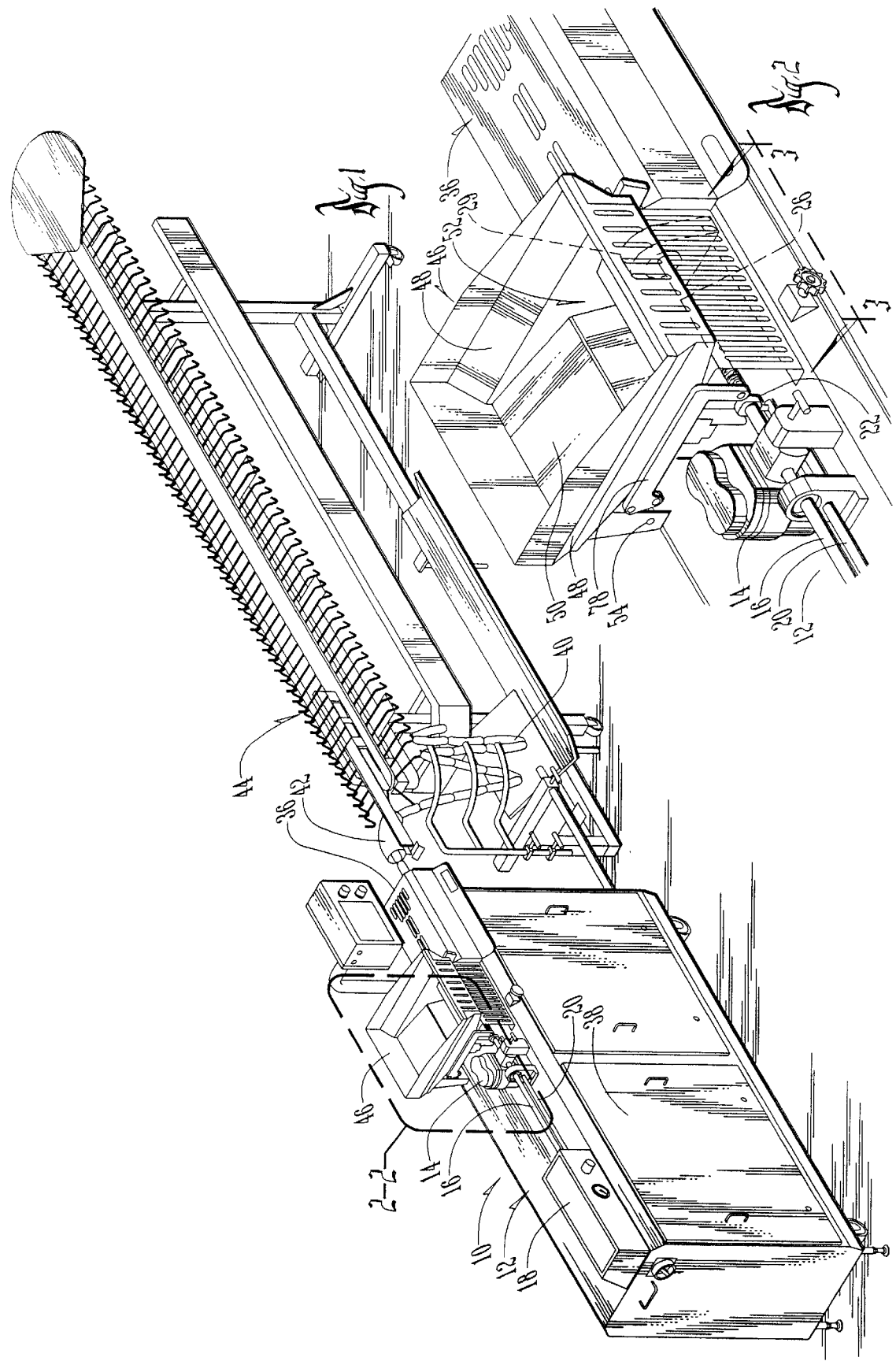

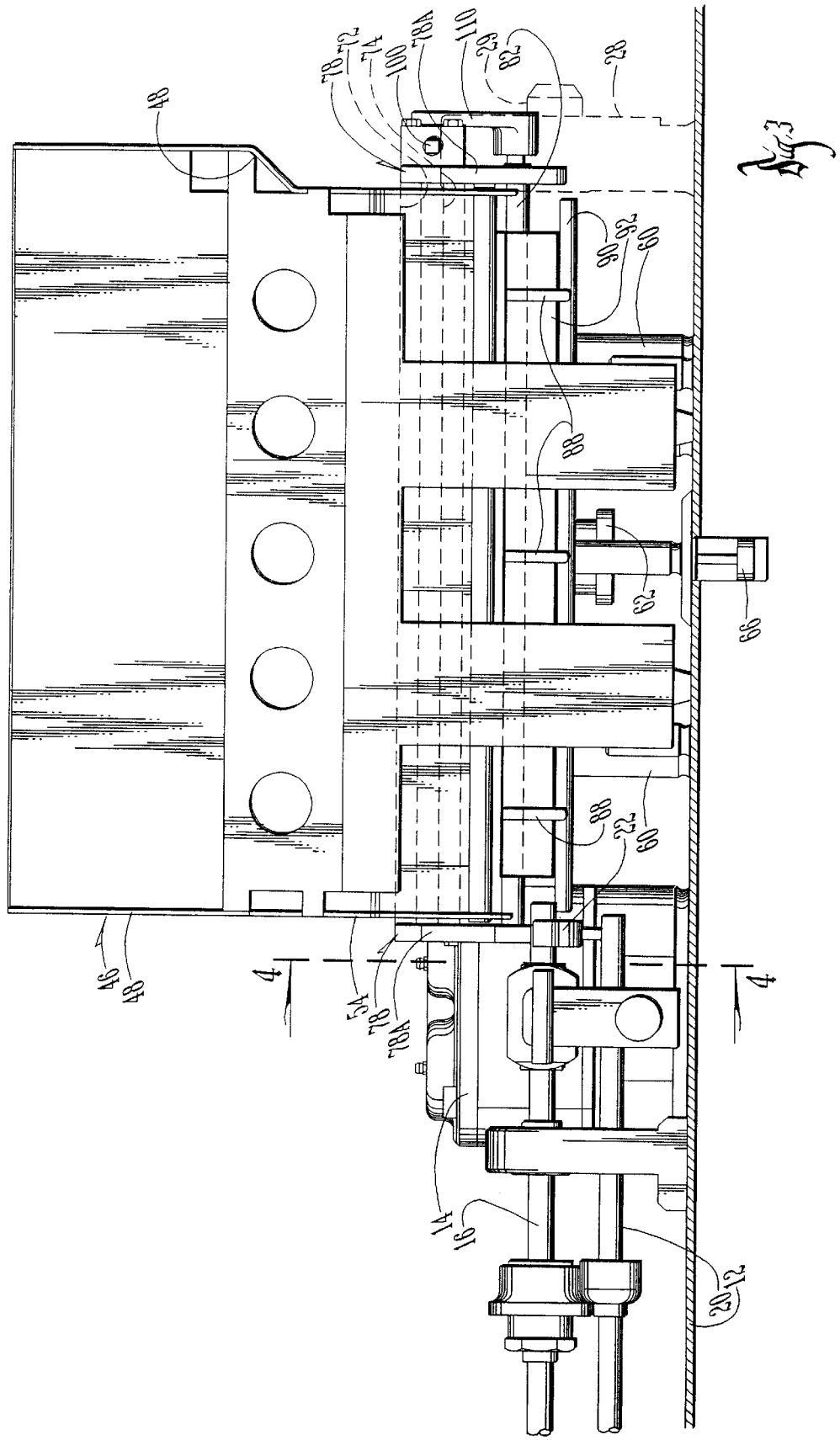

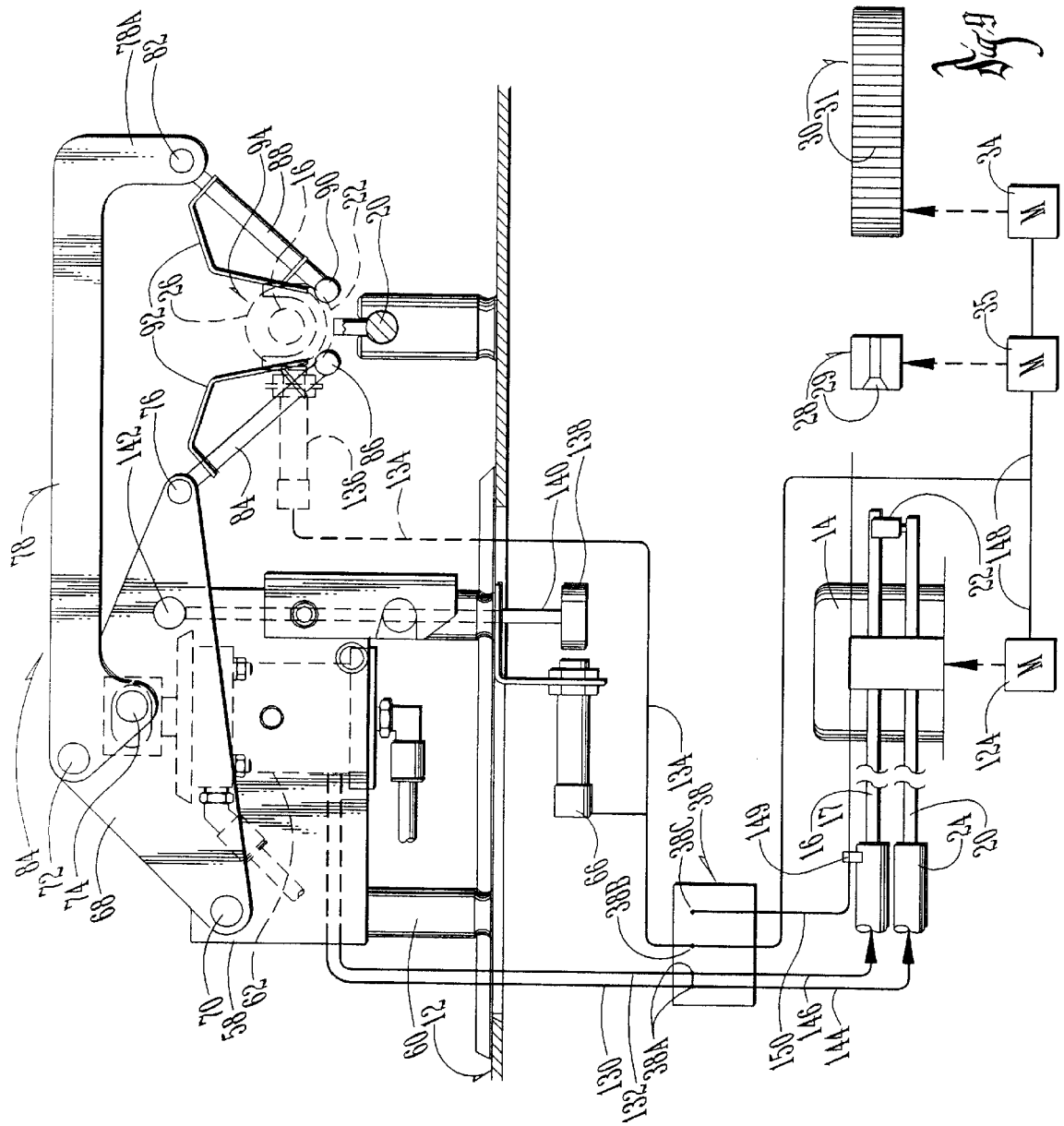

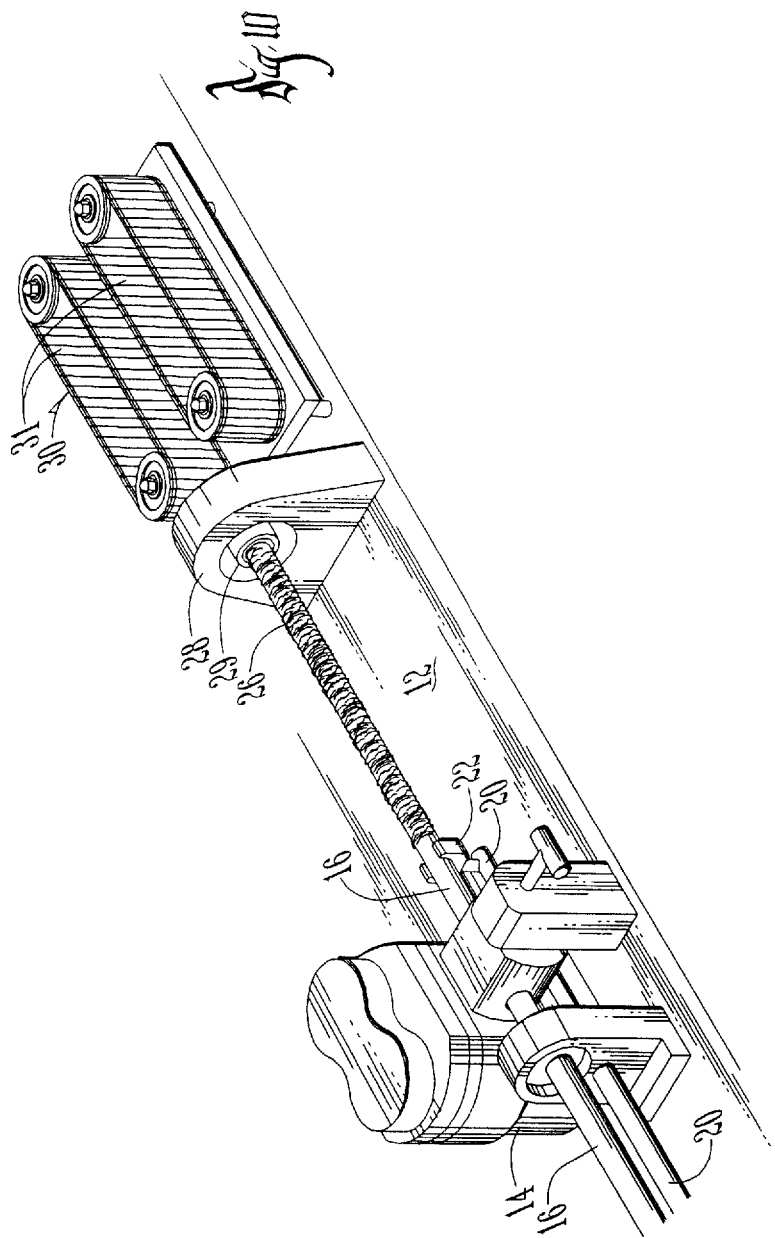

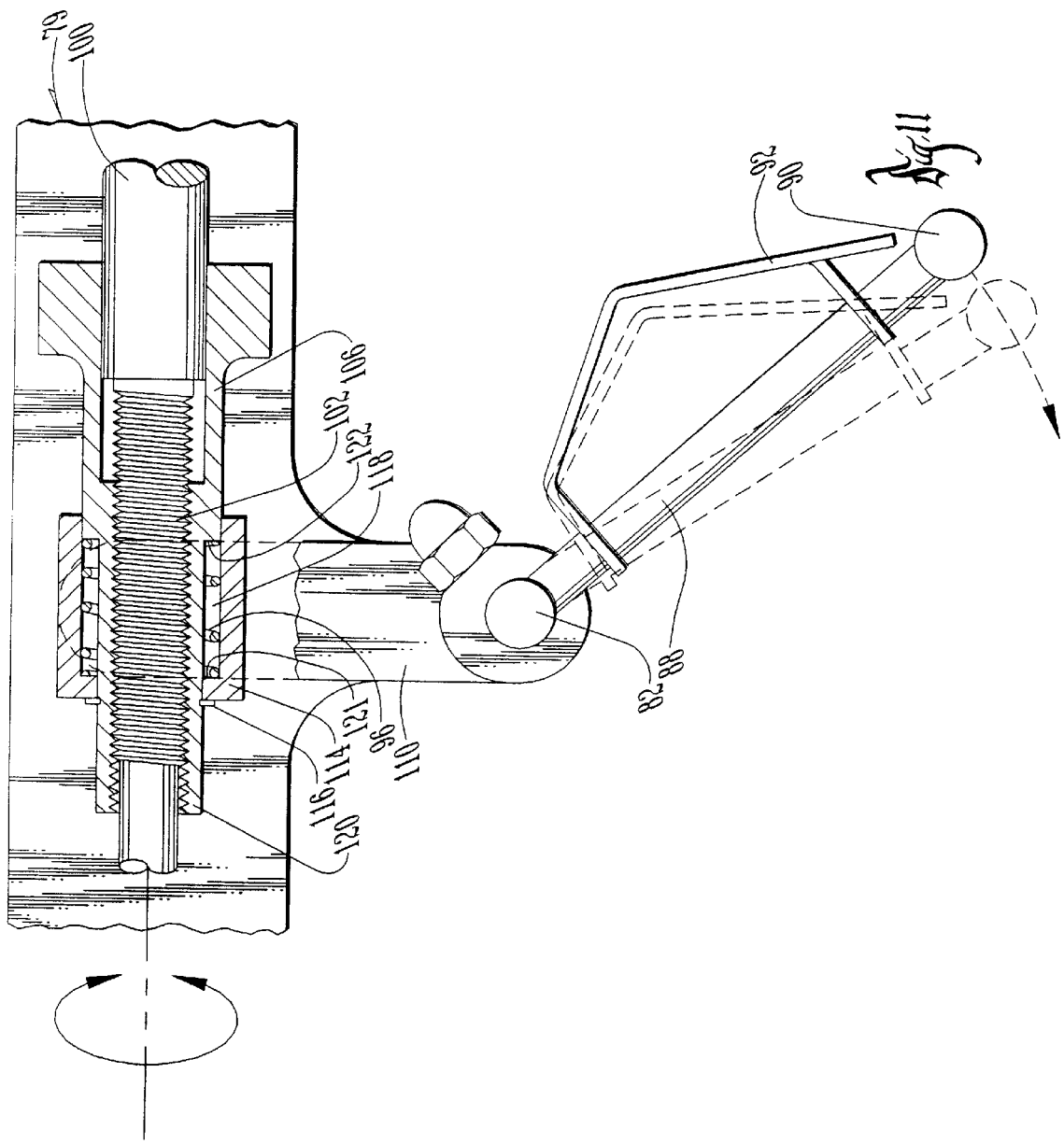

CASING HOPPER FOR MEAT EMULSION MACHINE, AND METHOD OF USE THEREOF

BACKGROUND OF THE INVENTION

Conventional sausage encasing machines such as described in U.S. Pat. No. 3,115,668 have a meat emulsion pump, an elongated hollow meat stuffing horn, a rotatable chuck, and a linker. A shirred casing is slidably mounted on the stuffing horn and meat emulsion extruded from the stuffing horn commences to fill the casing which is then rotated by the chuck, and is thereupon formed into a series of links by the linker. The shirred casings may have a total expanded length of 55 feet or so, but may be only 12 to 16 inches long in their shirred condition. A plurality of such shirred casings are typically held in a hopper and are sequentially held and then released to be positioned in the path of a forwardly advancing stuffing horn. Conventional casings are typically held in hoppers and then released by clamps or the like. While such arrangements are efficient, the positioning of a new casing in the path of an advancing stuffing horn does consume precious time, considering that the machine is capable of producing 30,000 or so of sausages in the course of an hour.

It is therefore a principal object of this invention to provide a casing hopper for a meat emulsion machine, and method of use thereof, which can substantially shorten the time for repositioning a shirred casing in the path of a stuffing horn when the filling of a first casing has been completed.

These and other objects will be apparent to those skilled in the art.

SUMMARY OF THE INVENTION

The sausage encasing machine of this invention has a conventional frame, a meat emulsion pump, a hollow meat emulsion stuffing horn with a discharge end and being longitudinally moveable on the frame. A conventional power means is provided to longitudinally move the stuffing horn. A conventional meat emulsion pump, a rotatably mounted chuck, and a linking mechanism are mounted in alignment on the frame. A casing hopper is pivotally mounted on the frame between the pump and the chuck and is adapted to hold a plurality of shirred hollow elongated casings. A cradle mechanism is movably mounted in the hopper and has opposite spaced moveable finger assemblies therein for guiding an elongated shirred hollow elongated casing in the hopper to a position of longitudinal alignment with the stuffing horn.

A method for positioning an elongated hollow shirred casing in position on a sausage making machine for penetration by an elongated stuffing horn involves the steps of placing a plurality of casings in a hopper in parallel stacked relation to each other. A moveable cradle is provided in the hopper to hold an elongated hollow shirred casing from among the plurality of casings in the hopper. The cradle is moved to locate the elongated hollow shirred casing in an operating position to be filled with meat emulsion. The stuffing horn is moved longitudinally into and through the casing into the operating position. That casing is released by the cradle, and the casing in the operating position is filled with meat emulsion.

BRIEF DESCRIPTION OF THE DRAWINGS

FIG. 1 is a perspective view of the sausage encasing machine of this invention;

FIG. 2 is an enlarged scale perspective view of the machine of FIG. 1 taken on line 2—2 of FIG. 1;

FIG. 3 is a front elevational view of the device of FIG. 2 taken on line 3—3 of FIG. 2;

FIG. 9 is a schematic view of the control circuitry for the device of this invention;

FIG. 10 is a perspective view of the conventional components of a sausage encasing machine used in this invention; and FIG. 11 is an enlarged scale sectional view taken on line 11—11 of FIG. 7.

DESCRIPTION OF THE PREFERRED EMBODIMENT

Figure 4:
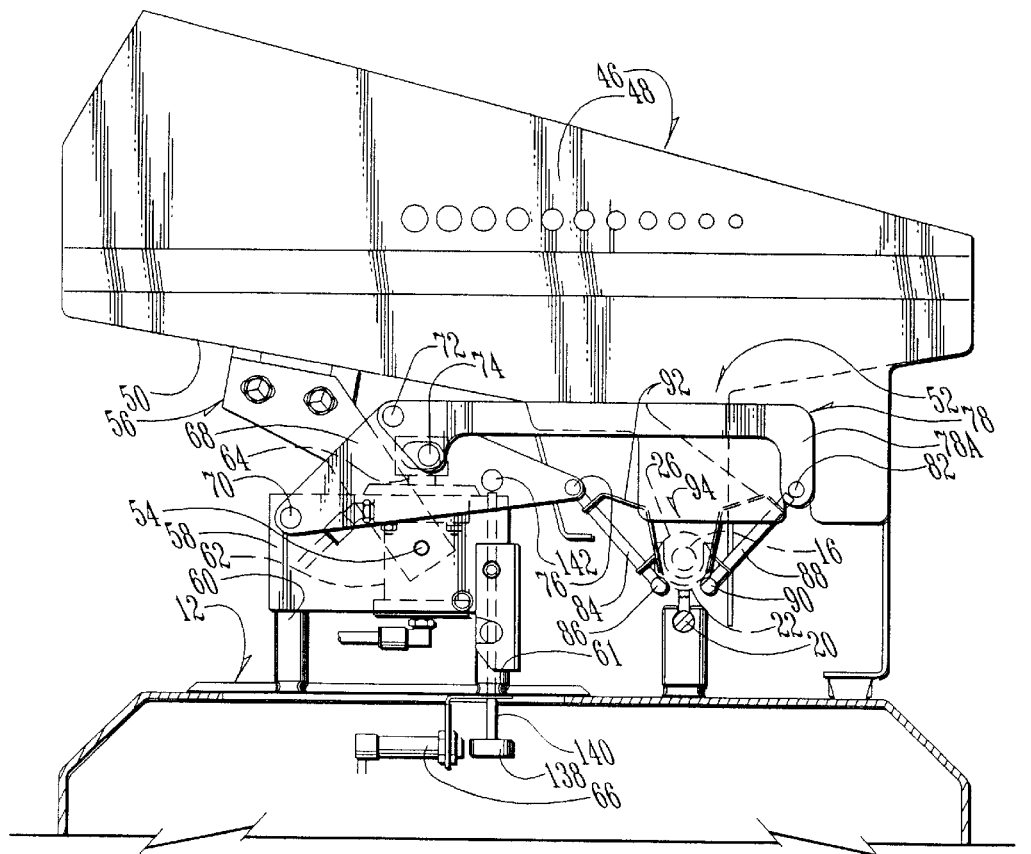
FIG. 4 is a side elevational view of the device of FIG. 3 taken on line 4—4 of FIG. 3.

A sausage encasing machine 10 (FIG. 1) has a frame 12, a conventional meat emulsion pump 14 connected to a source of meat emulsion. A stuffing horn 16 is slidably and operably connected to the pump 14 and is longitudinally moveable by air piston 17 (FIG. 9) contained in housing 18 (FIG. 1). A follower rod 20 is also slidably mounted on pump 14 parallel to horn 16 and has actuator 22 on one end slidably mounted on horn 16 (FIG. 10). Follower rod 20 is powered by air piston 24 (FIG. 9) located in housing 18. An elongated shirred sausage casing 26 is conventionally mounted on horn 16. The forward end of horn 16 conventionally terminates adjacent twister housing 28 which has a hollow rotatable chuck 29 which receives a meat filled casing 26 and rotates it before the meat filled casing moves into conventional linker 30 (FIG. 10). The chains 31 of linker 30 are rotated by motor 34 (FIG. 9) through suitable shafts, gears or belts. The conventional chuck 29 in housing 28 is rotated by motor 35 (FIG. 9), through suitable shafts and gears. Linker 30 is positioned within housing 36 (FIG. 1). The foregoing components are all conventional and are well known in the art, (see U.S. Pat. No. 3,115,668) and are controlled by computer control 38 (FIGS. 1 and 9) as will be explained hereafter.

The completed strand of sausages 40 exits machine 10 through horn 42 and the strand is deposited on the chain of hooks of conventional conveyor 44 (FIG. 1).

A casing hopper 46 has tapered sidewalls 48 and a sloping bottom 50 (FIG. 2) which cause shirred casings 26 therein to migrate downwardly towards a bottom opening 52 (FIG. 4). Hopper 46 is pivoted at 54 (FIG. 2) to any convenient side supports 56 (FIG. 4).

Figure 5:
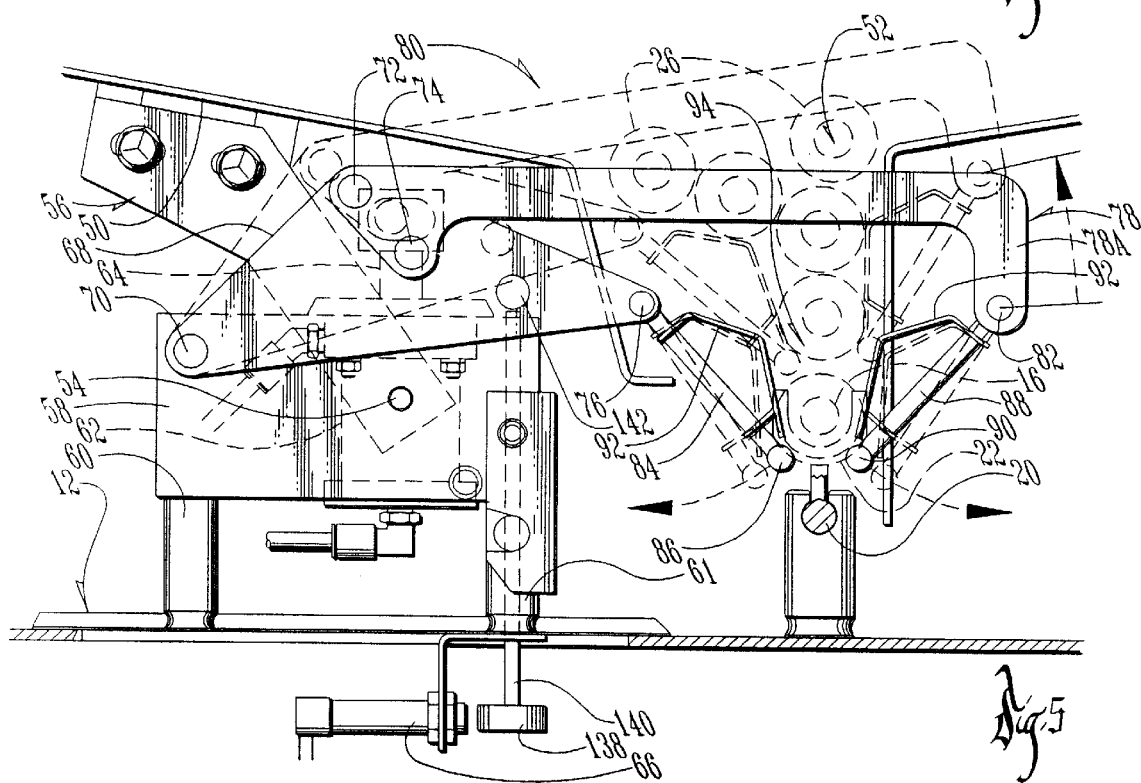
FIG. 5 is an enlarged scale elevational view similar to that FIG. 4.

A center frame 58 (FIGS. 4 and 5) is mounted on posts 60 and 61 which extend upwardly from the top of frame 12. An air cylinder 62 is vertically mounted on the top of frame 58, and piston rod 64 extends upwardly therefrom (FIG. 5). An electronic sensor 66 is secured to the top of frame 12 as will be discussed hereafter.

A pair of parallel triangular plates 68 are interconnected by four spaced parallel rods 70, 72, 74 and 142 (FIG. 4). Rod 70 extends through and is supported by frame 58 and provides a pivot axis for plates 68. Rod 74 extends through an elongated horizontal slot 74A on piston rod 64 of cylinder 62. Rods 72 and 74 have their ends rigidly secured to cradle arms 78 and 79 of cradle 80. Cradle arms 78 and 79 have a down-turned tab 78A at their forward ends. (FIGS. 4 and 5). As seen in FIG. 5, cradle 80 and cradle arms 78 and 79 are pivoted upwardly and downwardly on the axis of rod 70.

Figures 7, 8:
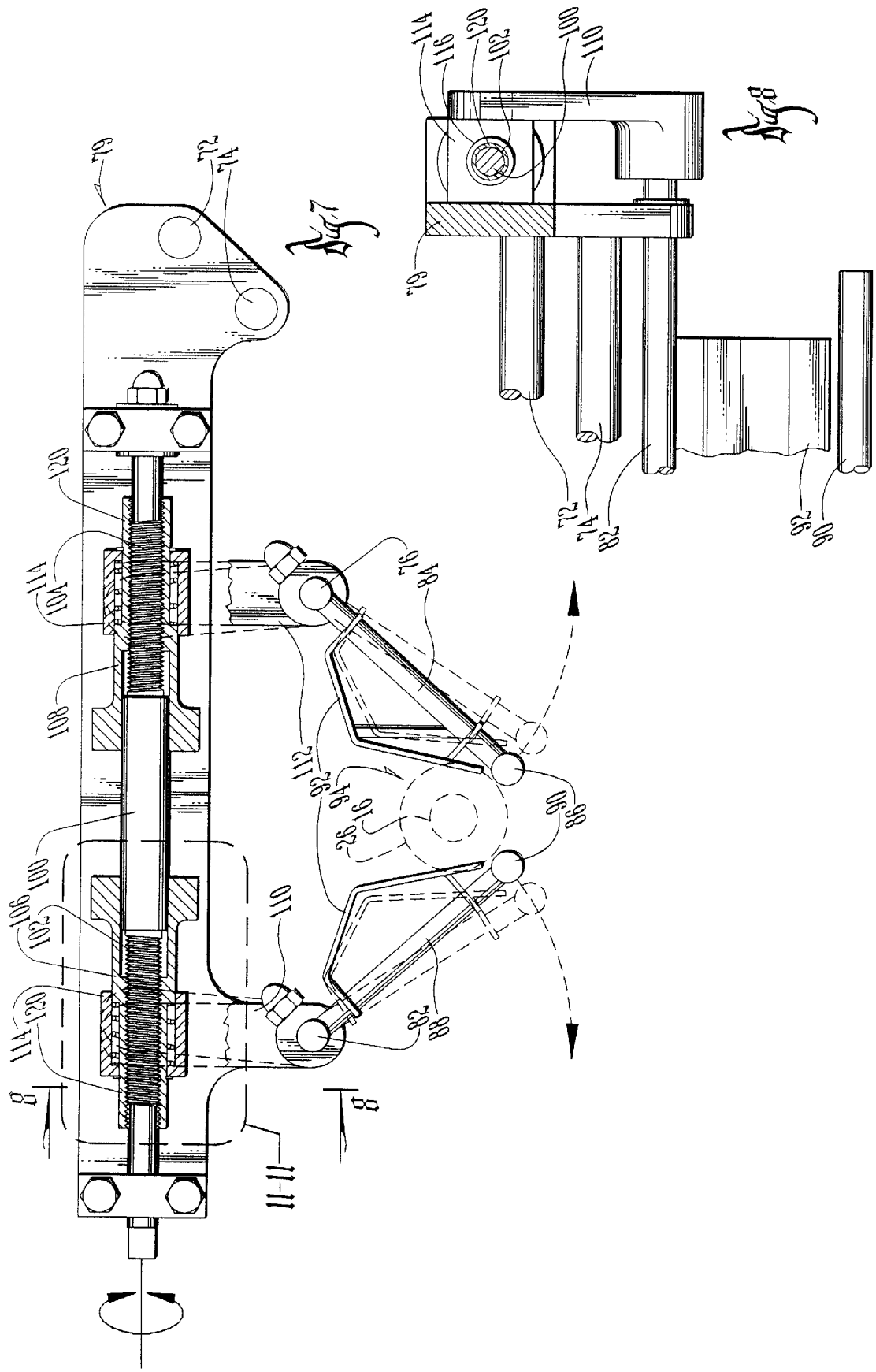
FIG. 7 is an enlarged scale elevational view taken on line 7—7 of FIG. 6.
FIG. 8 is an enlarged scale sectional view taken on line 8—8 of FIG. 7.

A plurality of spaced fingers 84 are welded by upper ends to rod 76, and are welded to a lower end to rod 86 (FIG. 4). Similarly, spaced fingers 88 are welded at an upper end to rod 82 and are welded at a lower end to rod 90. Guide plates 92 are secured to fingers 84 and 88 to define a throat opening 94 (FIGS. 3–5) to receive a single casing 26. As seen by the arrows in FIGS. 5 and 7, the fingers 84 and 88 move away from each other when the cradle 80 and cradle arms 78, 79 pivot upwardly from the points of the solid lines in FIG. 5 to the position shown by the dotted lines. This spring action is induced by springs 96 (FIG. 11). A rod 100 is mounted on cradle arm 79 and has opposite threads at 102 and 104 extending through hollow internally threaded studs 106 and 108, respectively, which are rigidly secured to arm 79. Arms 110 and 112 extend upwardly from rigid connections to rods 76 and 82, respectively, and are rigidly connected at their upper ends to sleeves 114 slidably mounted on studs 106 and 108. (FIG. 7). Clips 116 on studs 106 and 108 limit the outward slidable movement of sleeves 114 on the studs. Springs 96 dwell in an annular space 118 between the inside of sleeves 114 and an outer reduced diameter portion 120 of studs 106 and 108 and between opposite spaced shoulders 121 and 122 on one end of sleeves 114 and the inner end of portion 120.

Figure 6:
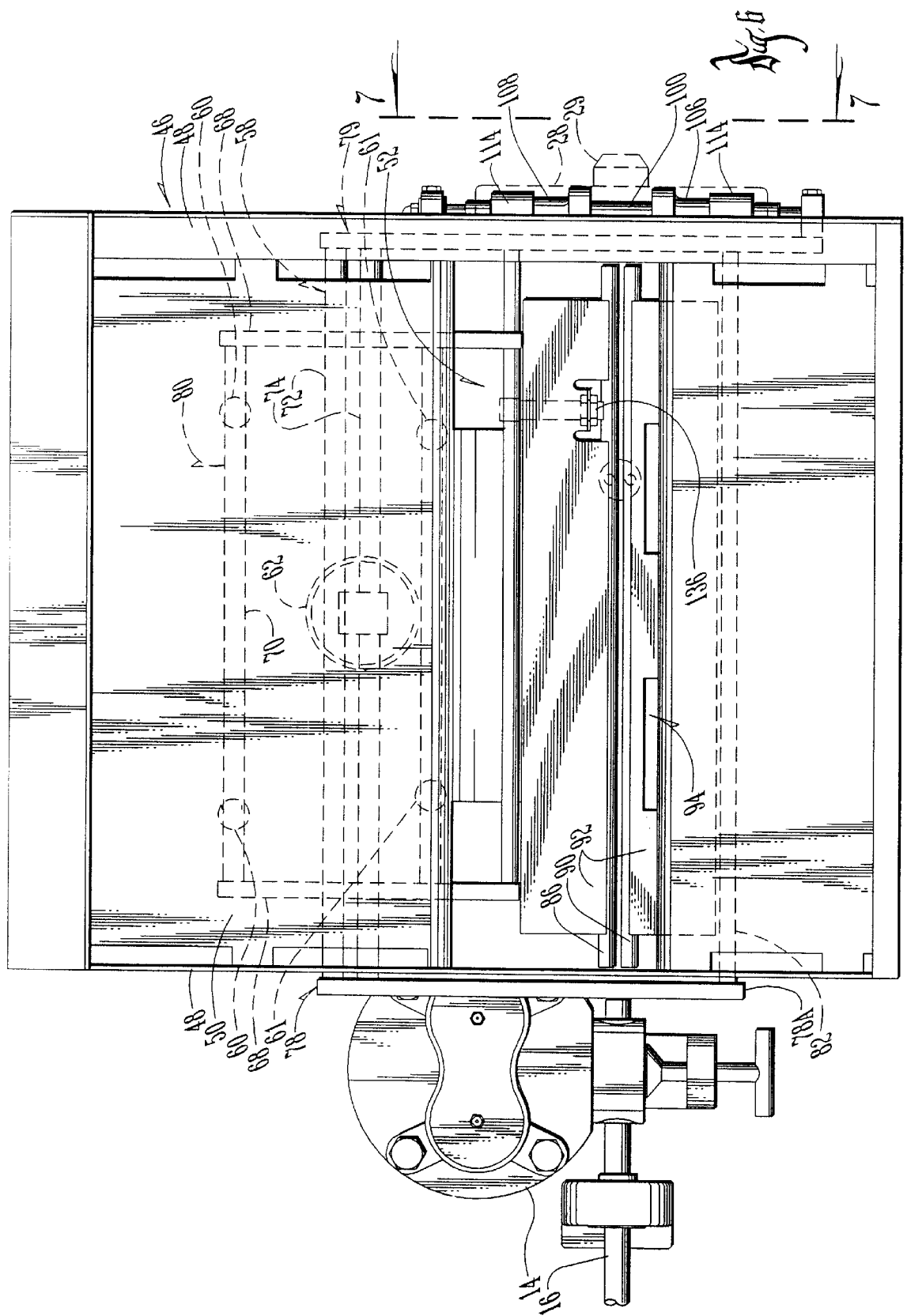
FIG. 6 is an enlarged scale plan view of the device of FIG. 4.

With reference to FIG. 9, a pump motor 124 is mounted on frame 12 and is conventionally connected to pump 14. Motors 35 and 34 are similarly mounted and connected to chuck 28 and linker 30, respectively. Terminal 38A on computer 38 is connected by lines 130 and 132 to air cylinder 62 to cause the cradle 80 to alternately raise or lower, as described above. Sensor 66 is connected by line 134 to computer terminal 38B. Line 134 also extends to sensor 136 (FIG. 6) which is mounted on plate 92 to detect the presence of a casing 26 with opening 94 (FIG. 4) between plates 92. Sensor 66 senses conductor 138 mounted on the lower end of rod 140 when the cradle is in its lower position and the stuffing horn 16 is in its forward position within the opening 94 between plates 92 (FIG. 4). The upper end of rod 140 is depressed by horizontal rod 142 (FIGS. 4 and 9).

Lines 144 and 146 connect computer 38 to air cylinders 17 and 24 (FIG. 9). Line 148 connects computer 38 to motors 124, 34 and 35.

With reference to FIG. 7, the left hand end of rod 100 can be rotated in either direction to longitudinally move the threaded studs 106 and 108 either towards each other or away from each other as described above. This will cause the fingers 84 and 88, and guide plates 92 to move either towards each other or away from each other as shown by the dotted lines in FIG. 7, to position the casing 26 at the proper height for insertion of the stuffing horn 16. When a cycle of the machine is called for on computer 38 at terminal 38C, the cradle 80 pivots downwardly. Its lower movement is limited by any convenient stop means (not shown). The command of computer 38 to lower the cradle 80 is transmitted by line 132 to cylinder 62. The sensor 66 senses that the cradle 80 is in its lowered position, and the sensor 136 senses that the casing 26 is in position. A signal is thereupon transmitted to computer 38 via line 134 whereupon the computer advances the stuffing horn 16 into the opening 94 (FIG. 4) by actuating air cylinder 17 through line 146. The computer 38 simultaneously actuates air cylinder 24 through line 144 to advance follower rod 20 with horn 16. The stuffing horn 16 extends through the center opening of casing 26. Sensor 149 senses that the stuffing horn 16 is fully extended. Upon receipt of the signal from sensor 149, via line 150 of the computer 38 energizes pump motor 124, chuck motor 35, and linker motor 34 via line 148. The machine 10 then functions in conventional manner to provide meat emulsion from pump 14 through stuffing horn 16 and into casing 26 whereupon the filled casing is rotated by chuck 29, and the elongated strand of filled casing is thereupon linked conventionally through the linker 30. While this is taking place, the computer through line 130 causes air cylinder 62 to lift the cradle thus clearing the fingers 84, 88 from the casing. The upward rotation of the cradle 80 disrupts the casings 26 in the casing hopper 46 relative to each other, thus positioning one of the casings 26 to be in the load position on the fingers 84, 88 (FIG. 7). The cradle 80 remains in the upper position until signal by computer 38 moves the cradle back to the lowered position wherein a second casing 26 is dropped into position in opening 94. The above described cycle is therein repeated. Power to the motors 124, 34 and 35 is withdrawn by the computer 38 after the first casing 26 is filled. The computer also signals air cylinders 17 and 24 to withdraw the stuffing horn 16 and the follower rod 20.

It is therefore seen that the foregoing structure of this invention will achieve at least all of its stated objectives.

What is claimed is:

1. A sausage encasing machine, comprising,
   a frame,
   a meat emulsion pump,
   a hollow meat emulsion stuffing horn having a discharge end operatively connected to said pump and being longitudinally moveable on said frame,
   power means on said frame for selectively longitudinally moving said stuffing horn in forwardly or rearwardly directions with respect to said frame,
   a rotatably mounted chuck on said frame having a center opening aligned with a center axis of said stuffing horn,
   a linking device mounted on said frame downstream from said chuck for linking a strand of meat emulsion extruded from the discharge end of said stuffing horn,
   a casing hopper mounted on said frame above and between said pump and said chuck, and adapted to hold a plurality of shirred hollow elongated casings,
   a cradle mechanism in said hopper having opposite spaced moveable finger assemblies therein for guiding an elongated shirred hollow elongated casing in said hopper to a position of longitudinal alignment with said stuffing horn.

2. The machine of claim 1 wherein a control system is mounted on said machine and is operatively connected to said power means, said pump, said stuffing horn, said chuck, said lifting device to raise and lower said cradle mechanism with respect to said hopper; to longitudinally move said stuffing horn by said power means to intermittently operate said pump, said chuck and said linking device.

3. The machine of claim 2 wherein said control system includes a first sensor to emit a signal when said cradle is in its lower position to then actuate said power means so that said stuffing horn can longitudinally move through a hollow casing in said hopper.

4. The machine of claim 3 wherein said control system includes a second sensor which emits a signal when a hollow casing is in said cradle in a position of longitudinal alignment with a longitudinal center axis of said stuffing horn.

5. The machine of claim 1 wherein said hopper is pivotally mounted on said frame.

6. The machine of claim 1 wherein said cradle mechanism includes means for adjusting the space between said finger assemblies.

7. The machine of claim 1 wherein said finger assemblies are resiliently mounted within said cradle to be yieldably positioned in an operating position within said cradle to engage an elongated hollow casing therebetween.

8. The machine of claim 1 wherein said finger assemblies include opposite elongated plates.

9. The machine of claim 2 wherein a second power means is connected to said control system and said cradle mechanism to raise and lower said cradle mechanism within said hopper.

10. A method for positioning an elongated hollow shirred casing in positions on a sausage making machine for penetration by an elongated stuffing horn, comprising, placing a plurality of elongated hollow shirred casings in a hopper in parallel stacked relation to each other, providing a moveable cradle in said hopper to hold an elongated hollow shirred casing, moving said cradle to locate said elongated hollow shirred casing in an operating position to be filled with meat emulsion, extending a hollow meat emulsion stuffing horn into and through the casing in said operating position, releasing said cradle from engagement with a casing in said operating position, and filling said casing in said operating position with meat emulsion.

11. The method of claim 10 wherein said cradle is moved after a first casing is filled with meat emulsion to cause a second casing to move to said operating position.

12. The method of claim 10 wherein a casing is moved into said operating position by opposite finger assemblies movably mounted in said hopper.

* * * * *